US012801483B2

(12) United States Patent
Mukherjee et al.

(10) Patent No.: US 12,801,483 B2
(45) Date of Patent: Nov. 17, 2026

(54) SYSTEM AND METHOD FOR DETECTION OF PROXY SERVER KEY PERFORMANCE INDICATORS (KPI) DETERIORATION, ALERTING AND MITIGATION

(71) Applicant: Bank of America Corporation, Charlotte, NC (US)

(72) Inventors: Maharaj Mukherjee, Poughkeepsie, NY (US); Carl Benda, Charlotte, NC (US); Rahul Uniyal, Dehradun (IN); Vijay Yarabolu, Hyderabad (IN); Aditya Krishnanand Chaubey, Mumbai (IN); Viraj Shah, Maharashtra (IN); Duy Minh Pham, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/816,222

(22) Filed: Aug. 27, 2024

(65) Prior Publication Data

US 2026/0064519 A1 Mar. 5, 2026

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/3428* (2013.01); *G06F 11/3442* (2013.01); *H04L 67/1029* (2013.01)

(58) Field of Classification Search
CPC ............. G06F 11/0793; G06F 11/3428; G06F 11/3442
(Continued)

(56) References Cited

U.S. PATENT DOCUMENTS 7,719,997 B2 5/2010 Weinman
8,612,802 B1 12/2013 Havemose
(Continued)

FOREIGN PATENT DOCUMENTS

CN 112101431 A 12/2020
CN 113139610 A 7/2021
(Continued)

OTHER PUBLICATIONS

Sep. 10, 2025—(US) Office Action—U.S. Appl. No. 18/816,304.
(Continued)

*Primary Examiner* — Sarai E Butler
(74) *Attorney, Agent, or Firm* — Banner & Witcoff, Ltd.

(57) ABSTRACT

A computing platform may train, using historical application programming interface (API) call information, an anomaly detection engine, to output, for a target system, a binary value indicating whether or not the target system is experiencing anomalous API call behavior, where the target system includes a proxy server. The computing platform may monitor the target system to collect API call information for the proxy server. The computing platform may input the API call information into the anomaly detection engine, which may output, based on the API call information, a binary value indicating whether the API call information. The computing platform may compare the binary value to a predetermined threshold value. Based on identifying that the selected binary value is less than the predetermined threshold value, the computing platform may label the target system as experiencing anomalous behavior. The computing platform may execute corrective actions to address the anomalous behavior.

17 Claims, 9 Drawing Sheets

(51) Int. Cl.
*G06F 11/34* (2006.01)
*H04L 67/1029* (2022.01)

(58) Field of Classification Search
USPC .......................................................... 714/1–57
See application file for complete search history.

(56) References Cited

U.S. PATENT DOCUMENTS

| | | | |
|---|---|---|---|
| 8,942,085 B1 | 1/2015 | Pani et al. | |
| 9,225,628 B2 | 12/2015 | Zahavi | |
| 9,367,366 B2 | 6/2016 | Xiong et al. | |
| 9,954,882 B2 | 4/2018 | Seo et al. | |
| 10,404,569 B2 | 9/2019 | Hershey et al. | |
| 10,749,883 B1 | 8/2020 | Martin et al. | |
| 10,990,516 B1* | 4/2021 | Merritt | G06F 11/3684 |
| 11,005,872 B2 | 5/2021 | Dherange et al. | |
| 11,080,906 B2 | 8/2021 | Garvey et al. | |
| 11,082,439 B2 | 8/2021 | Salunke et al. | |
| 11,126,167 B2 | 9/2021 | SayyarRodsari et al. | |
| 11,194,691 B2 | 12/2021 | Dherange et al. | |
| 11,308,407 B1 | 4/2022 | Guha et al. | |
| 11,455,639 B2 | 9/2022 | Manske et al. | |
| 11,507,563 B2 | 11/2022 | Yeddu | |
| 11,509,671 B2 | 11/2022 | Servajean et al. | |
| 11,544,585 B2 | 1/2023 | Ahringer et al. | |
| 11,561,849 B1* | 1/2023 | Kairali | G06F 11/079 |
| 11,687,438 B1 | 6/2023 | Torbett et al. | |
| 11,741,486 B1 | 8/2023 | Bar Eliyahu et al. | |
| 11,747,801 B2 | 9/2023 | SayyarRodsari et al. | |
| 11,748,568 B1 | 9/2023 | Orhan et al. | |
| 11,836,162 B2 | 12/2023 | Garvey et al. | |
| 11,868,957 B1 | 1/2024 | Bhure et al. | |
| 11,893,645 B2 | 2/2024 | Przechocki et al. | |
| 11,924,048 B2 | 3/2024 | Servajean et al. | |
| 11,962,484 B1 | 4/2024 | Jain et al. | |
| 12,050,628 B1 | 7/2024 | O'Hara et al. | |
| 12,056,000 B1 | 8/2024 | Kawata et al. | |
| 12,261,866 B1* | 3/2025 | Yen | H04L 67/306 |
| 12,298,990 B1 | 5/2025 | Han et al. | |
| 12,299,084 B2 | 5/2025 | Kallianpur et al. | |
| 2008/0263401 A1* | 10/2008 | Stenzel | H04L 41/5012 714/31 |
| 2010/0122114 A1* | 5/2010 | Hung | G11C 16/349 711/E12.001 |
| 2010/0262860 A1* | 10/2010 | Sargor | G06F 9/5083 714/E11.071 |
| 2013/0191681 A1 | 7/2013 | Moiseev et al. | |
| 2014/0195184 A1 | 7/2014 | Maeda et al. | |
| 2014/0304813 A1 | 10/2014 | Ma et al. | |
| 2015/0161024 A1 | 6/2015 | Gupta et al. | |
| 2017/0339178 A1 | 11/2017 | Mahaffey et al. | |
| 2019/0050515 A1* | 2/2019 | Su | G06N 3/0455 |
| 2019/0079821 A1 | 3/2019 | Jeong et al. | |
| 2020/0159624 A1* | 5/2020 | Malkov | G06N 20/00 |
| 2020/0285997 A1 | 9/2020 | Bhattacharyya et al. | |
| 2020/0387797 A1 | 12/2020 | Ryan et al. | |
| 2021/0011467 A1 | 1/2021 | SayyarRodsari et al. | |
| 2021/0064458 A1 | 3/2021 | Rathinasabapathy et al. | |
| 2021/0082292 A1 | 3/2021 | Sindhwani et al. | |
| 2021/0124342 A1 | 4/2021 | Shukla et al. | |
| 2021/0390507 A1 | 12/2021 | Reynolds et al. | |
| 2022/0058174 A1 | 2/2022 | Lemberg et al. | |
| 2022/0215007 A1 | 7/2022 | Bedadala et al. | |
| 2022/0262104 A1 | 8/2022 | Salman et al. | |
| 2022/0382611 A1 | 12/2022 | Kapish et al. | |
| 2023/0019703 A1 | 1/2023 | Behzad et al. | |
| 2023/0106369 A1 | 4/2023 | Flynn | |
| 2023/0118240 A1 | 4/2023 | Wong et al. | |
| 2023/0124166 A1* | 4/2023 | Mohanty | G06N 20/20 726/22 |
| 2023/0126842 A1 | 4/2023 | Tabet et al. | |
| 2023/0135825 A1 | 5/2023 | Surisetty et al. | |
| 2023/0195715 A1 | 6/2023 | Schleith et al. | |
| 2023/0229574 A1* | 7/2023 | Gandluri | G06F 11/2038 714/4.11 |
| 2023/0236918 A1 | 7/2023 | Pachamuthu et al. | |
| 2023/0274160 A1 | 8/2023 | Mujumdar et al. | |
| 2023/0275915 A1 | 8/2023 | Kaul | |
| 2023/0276080 A1 | 8/2023 | Penmetcha et al. | |
| 2023/0281068 A1 | 9/2023 | Friedrich et al. | |
| 2023/0308461 A1 | 9/2023 | Flysher et al. | |
| 2023/0315559 A1* | 10/2023 | Yokomatsu | G06F 11/0769 714/37 |
| 2023/0319069 A1 | 10/2023 | Birch et al. | |
| 2023/0325632 A1 | 10/2023 | Kasmani et al. | |
| 2023/0336447 A1 | 10/2023 | Kommula et al. | |
| 2023/0342656 A1 | 10/2023 | Robinson et al. | |
| 2023/0359706 A1 | 11/2023 | Yang et al. | |
| 2023/0368069 A1 | 11/2023 | Xu et al. | |
| 2023/0419402 A1 | 12/2023 | Ghelichi et al. | |
| 2024/0054399 A1 | 2/2024 | Hong et al. | |
| 2024/0086819 A1 | 3/2024 | Baviskar et al. | |
| 2024/0097999 A1 | 3/2024 | Sun et al. | |
| 2024/0144712 A1 | 5/2024 | Kumar et al. | |
| 2024/0152442 A1 | 5/2024 | Sethi et al. | |
| 2024/0184682 A1 | 6/2024 | Vudathu | |
| 2024/0195475 A1 | 6/2024 | Hellgren et al. | |
| 2024/0202326 A1 | 6/2024 | Josyula et al. | |
| 2024/0241867 A1* | 7/2024 | Nirantar | G06F 16/215 |
| 2024/0244070 A1 | 7/2024 | Mohapatra et al. | |
| 2024/0264810 A1 | 8/2024 | Jayaraman | |
| 2024/0282085 A1 | 8/2024 | Kondo | |
| 2024/0340225 A1 | 10/2024 | Pease et al. | |
| 2024/0340314 A1 | 10/2024 | Radon et al. | |
| 2024/0342911 A1 | 10/2024 | Sasashige et al. | |
| 2024/0403099 A1 | 12/2024 | Verma et al. | |
| 2025/0028737 A1 | 1/2025 | Bai et al. | |
| 2025/0103605 A1 | 3/2025 | Gianelle et al. | |
| 2025/0124502 A1 | 4/2025 | Antonini et al. | |
| 2025/0138935 A1 | 5/2025 | Atkinson et al. | |
| 2025/0165442 A1 | 5/2025 | Liu et al. | |
| 2025/0200073 A1 | 6/2025 | Ragukumar et al. | |
| 2025/0200355 A1 | 6/2025 | Ragukumar et al. | |
| 2025/0235154 A1 | 7/2025 | Binnal et al. | |
| 2025/0272182 A1 | 8/2025 | Sethi et al. | |

FOREIGN PATENT DOCUMENTS

| | | | |
|---|---|---|---|
| CN | 113190842 | A | 7/2021 |
| CN | 118301011 | A | 7/2024 |
| CN | 118940854 | A | 11/2024 |
| EP | 3055747 | A1 | 8/2016 |
| EP | 3423954 | A1 | 1/2019 |
| JP | 5301310 | B2 | 9/2013 |
| JP | 5538597 | B2 | 7/2014 |
| TW | 201510688 | A | 3/2015 |
| WO | 2011132524 | A1 | 10/2011 |

OTHER PUBLICATIONS

Jan. 23, 2026—(US) Notice of Allowance—U.S. Appl. No. 18/816,304.
Feb. 3, 2026—(US) Office Action—U.S. Appl. No. 18/816,272.
Oct. 1, 20250—(US) Non-Final Office Action—U.S. Appl. No. 18/794,195.
Jun. 1, 20256—(US) Non-Final Office Action—U.S. Appl. No. 18/794,195.
May 2, 20260—(US) Notice of Allowance—U.S. Appl. No. 18/816,304.
Jul. 7, 2026—(US) Final Office Action—U.S. Appl. No. 18/816,272.
Jun. 2, 20262—(US) Non-Final Office Action—U.S. Appl. No. 18/794,195.

* cited by examiner

SYSTEM AND METHOD FOR DETECTION OF PROXY SERVER KEY PERFORMANCE INDICATORS (KPI) DETERIORATION, ALERTING AND MITIGATION

BACKGROUND

In some instances, enterprise organizations may have an obligation to ensure that their technical infrastructure always operates flawlessly and with maximum efficiency. To do so, it may be advantageous for such enterprise organizations to predict and understand system anomalies within their proxy servers, and to take mitigating actions in the event that an anomaly is detected. Proxy servers may be monitored directly based on their system utilization and basic performance monitoring of central processing units (CPU), memory, cache, or the like, however, such direct measurements of system performance may create substantial additional load on already overloaded servers.

SUMMARY

Aspects of the disclosure provide effective, efficient, scalable, and convenient technical solutions that address and overcome the technical problems associated with detecting system anomalies. In accordance with one or more embodiments of the disclosure, a computing platform comprising at least one processor, a communication interface, and memory storing computer-readable instructions may train, using historical application programming interface (API) call information, an anomaly detection engine, which may configure the anomaly detection engine to output, for a target system, a binary value indicating whether or not the target system is experiencing anomalous API call behavior, wherein the target system includes a proxy server. The computing platform may monitor the target system to collect API call information for the proxy server. The computing platform may input the API call information into the anomaly detection engine, which may output, based on the API call information, a binary value indicating whether the API call information is anomalous. The computing platform may compare the binary value to a predetermined threshold value. Based on identifying that the selected binary value is less than the predetermined threshold value, the computing platform may label the target system as experiencing anomalous behavior. The computing platform may execute one or more corrective actions to address the anomalous behavior.

In one or more instances, outputting the binary value may be based on a time series analysis of the API call information. In one or more instances, the target system may include one or more supporting applications, one or more load balancers, one or more additional proxy servers, and one or more database servers.

In one or more examples, the computing platform may train, using the historical API call information, a plurality of additional anomaly detection engines, where each of the plurality of additional anomaly detection engines may correspond to a different machine learning model, and where training the plurality of additional anomaly detection engines may configure each of the additional plurality of anomaly detection engines to output an additional binary value indicating whether or not the target system is experiencing anomalous API call behavior and additional confidence values corresponding to the additional binary values. In one or more examples, one of the anomaly detection engine or the plurality of additional anomaly detection engines may include an isolation forest model.

In one or more instances, outputting the binary value further may include outputting a confidence value indicating a confidence of the anomaly detection engine that the binary value correctly indicates whether or not an anomaly is detected. In one or more instances, comparing the binary value to the predetermined threshold value may include inputting the binary value and the additional binary values into an arbitration engine, which may generate a weighted average based on the confidence value, the additional confidence values, the binary value, and the additional binary values, and comparing the weighted average to the predetermined threshold value.

In one or more instances, generating the weighted average may include generating a first average of the confidence values associated with binary values indicating an anomaly, multiplying the first average by the binary value associated with anomalous behavior to produce a first weighted average, generating a second average of the confidence values associated with binary values indicating no anomaly, multiplying the second average by the binary value associated with non-anomalous behavior to produce a second weighted average, generating absolute values of the first average and the second average, and selecting, as the weighted average, one of the first average or the second average based on which of the first average or the second average has a higher associated absolute value.

In one or more examples, the computing platform may train, using historical anomaly prediction information, a hybrid artificial intelligence engine, where training the hybrid artificial intelligence engine may configure the hybrid artificial intelligence engine to assign weight values to each of the anomaly detection engine and the plurality of additional anomaly detection engines and to select an anomaly detection result from the anomaly detection engine and the plurality of additional anomaly detection engines based on the weight values. In one or more examples, comparing the binary value to the predetermined threshold value may further include inputting the binary value and the additional binary values into the hybrid artificial intelligence engine, where the hybrid artificial intelligence engine may assign the weight values to each of the anomaly detection engine and the plurality of additional anomaly detection engines, and select a binary value based on the weighting, and comparing the selected binary value to the predetermined threshold value.

In one or more instances, assigning the weight values may include assigning, to each of the anomaly detection engine and the plurality of additional anomaly detection engines, a first weight value generated using statistical machine learning and a second weight value generated based on human intelligence. In one or more instances, selecting the binary value may include selecting the binary value produced with the highest weight value.

In one or more examples, the target system may be labelled as experiencing the anomalous behavior in real time. In one or more examples, the target system may be labelled as experiencing the anomalous behavior in a predictive manner.

In one or more instances, executing the one or more corrective actions may include one or more of: taking the proxy server offline, redistributing load of the proxy server, or adding memory to the proxy server. In one or more instances, the computing platform may send, to a user device of a system administrator, an alert indicating the anomalous behavior and one or more commands directing the user device to display the alert, which may cause the user device to display the alert. In one or more instances, the computing platform may update, based on the API call information and the label, the anomaly detection engine.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using API calls and/or other internet requests (e.g., GET, CONNECT, or the like) to perform indirect anomaly detection, and to alert a system administrator, thus enabling timely mitigation. For example, in computer networking, a proxy server may be a server application that acts as an intermediary between a client requesting a resource and the server providing that resource. It may improve privacy, security, and performance in that process.

An API proxy may sit between a client and an API, providing an access point to the API with additional functionality such as security, caching, or rate limiting, without requiring changes to the API. Reverse proxies, SSL proxies, and transparent proxies may be common types of proxies, each providing specific functionalities. Like other servers, a proxy server may be monitored directly by its system utilization and basic system performance monitoring of CPU, memory, cache, or the like. However direct measurements of system performance may create a load on the already overloaded servers. Accordingly, described herein is an indirect method of measuring system performance by detecting anomalies on API commands such as GET, CONNECT, or the like.

In a connected system that includes multiple supporting applications, load balancers, proxy servers, database servers, and/or other systems, it may be difficult to identify a root of a problem. Accordingly, as described further herein, historical data may be used to set a baseline level for a key performance index such as a count of API commands. In these instances, any types of anomalies or degradation from the baseline may be an indication of potential system problems. These and other features are described in greater detail below.

Figure 1A:
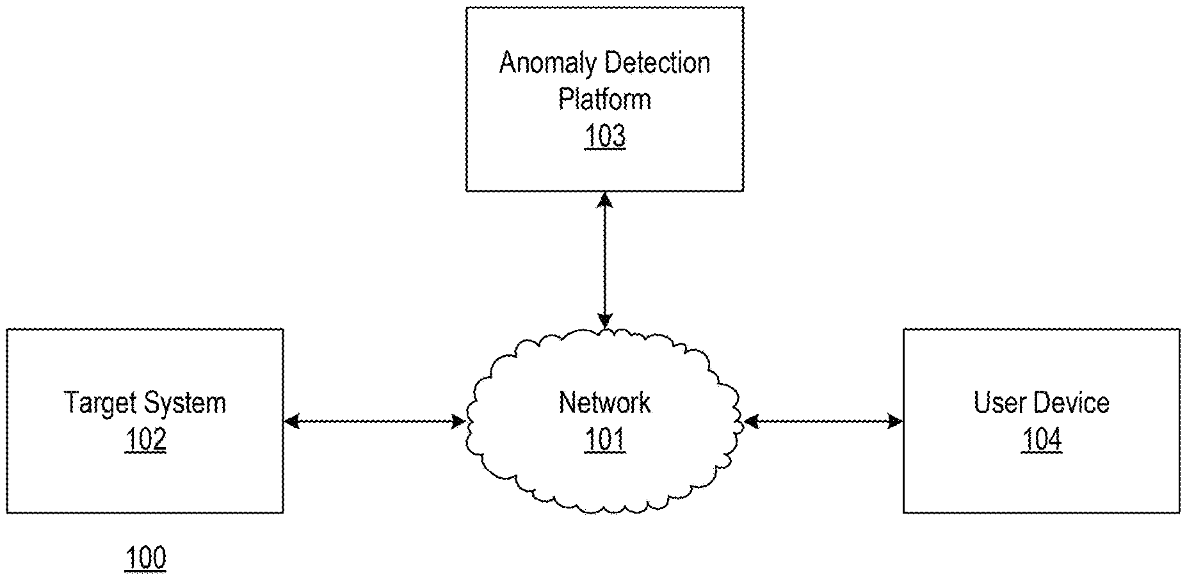
FIGS. 1A and 1B depict an illustrative computing environment for using application programming interface (API) calls to detect proxy server anomalies in accordance with one or more example embodiments.
Figure 1B:
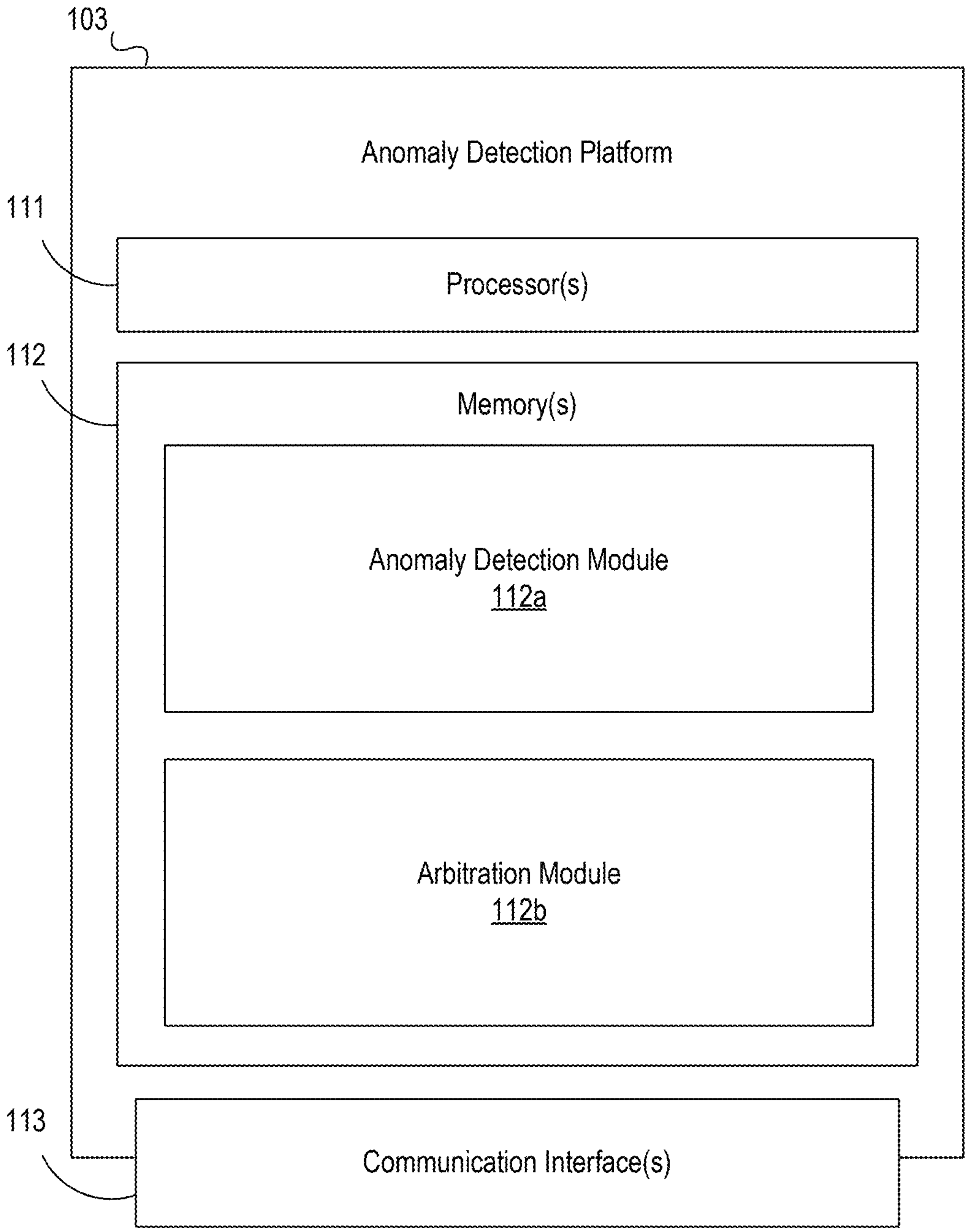

FIGS. 1A-1B depict an illustrative computing environment for using application programming interface (API) calls to detect proxy server anomalies in accordance with one or more example embodiments. Referring to FIG. 1A, computing environment 100 may include one or more computer systems. For example, computing environment 100 may include target system 102, anomaly detection platform 103, and user device 104.

Target system 102 may include one or more computing devices (servers, server blades, or the like) and/or other computer components (e.g., processors, memories, communication interfaces, or the like). For example, the target system 102 may be configured to perform various computing tasks, and may have associated parameters that may change as the tasks are performed. For example, available processing resources, computer processing units (CPU), or memory, processing speed, latency, and/or other parameters associated with the target system 102 may adjust. In some instances, the target system 102 may be configured with one or more supporting applications, load balancers, proxy servers, database servers, and/or other aspects. In some instances, the target system 102 may be an enterprise computing system maintained and/or otherwise associated with an enterprise organization, such as a financial institution. Although a single target system is illustrated, any number of such target systems may be included without departing from the scope of the disclosure.

Anomaly detection platform 103 may be or include one or more computing devices (e.g., servers, server blades, or the like) and/or other computer components (e.g., processors, memories, communication interfaces, or the like). For example, anomaly detection platform 103 may be configured to train, host, and/or otherwise maintain a plurality of anomaly detection engines, which may, e.g., be machine learning models, configured to detect anomalies in system performance based on the input of API command information. In some instances, the anomaly detection platform 103 may further be configured with an arbitration engine, which may, e.g., be configured to reconcile the results of the anomaly detection performed across the plurality of anomaly detection engines (which may, e.g., differ from engine to engine) using a rule based approach and/or hybrid artificial intelligence. In these instances, the anomaly detection platform 103 may be configured to execute and/or otherwise initiate one or more corrective actions to address any detected system anomalies.

User device 104 may be or include one or more devices (e.g., laptop computers, desktop computer, smartphones, tablets, and/or other devices) configured for use in providing system administration functions. For example, the user device 104 may be configured to display one or more graphical user interfaces to indicate detected anomalies, initiate corrective actions, and/or perform other functions. Any number of such user devices may be used to implement the techniques described herein without departing from the scope of the disclosure.

Computing environment 100 also may include one or more networks, which may interconnect target system 102, anomaly detection platform 103, and user device 104. For example, computing environment 100 may include a network 101 (which may interconnect, e.g., target system 102, anomaly detection platform 103, and user device 104).

In one or more arrangements, target system 102, anomaly detection platform 103, and user device 104 may be any type of computing device capable of receiving a user interface, receiving input via the user interface, and communicating the received input to one or more other computing devices, and/or training, hosting, executing, and/or otherwise maintaining one or more machine learning models, displaying graphical user interfaces, and/or performing other functions. For example, target system 102, anomaly detection platform 103, user device 104 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of target system 102, anomaly detection platform 103, and/or user device 104 may, in some instances, be special-purpose computing devices configured to perform specific functions.

Referring to FIG. 1B, anomaly detection platform 103 may include one or more processors 111, memory 112, and communication interface 113. A data bus may interconnect processor 111, memory 112, and communication interface 113. Communication interface 113 may be a network interface configured to support communication between anomaly detection platform 103 and one or more networks (e.g., network 101, or the like). Memory 112 may include one or more program modules having instructions that when executed by processor 111 cause anomaly detection platform 103 to perform one or more functions described herein and/or one or more databases that may store and/or otherwise maintain information which may be used by such program modules and/or processor 111. In some instances, the one or more program modules and/or databases may be stored by and/or maintained in different memory units of anomaly detection platform 103 and/or by different computing devices that may form and/or otherwise make up anomaly detection platform 103. For example, memory 112 may have, host, store, and/or include anomaly detection module 112*a* and arbitration module 112*b*. Anomaly detection module 112*a* may have instructions that direct and/or cause anomaly detection platform 103 to support a plurality of anomaly detection engines that execute advanced machine learning techniques to detect anomalies in system performance information. Arbitration module 112*b* may have instructions that direct and/or cause anomaly detection platform 103 to reconcile the outputs of the various anomaly detection engines of the anomaly detection module 112*a*.

Figure 2A:
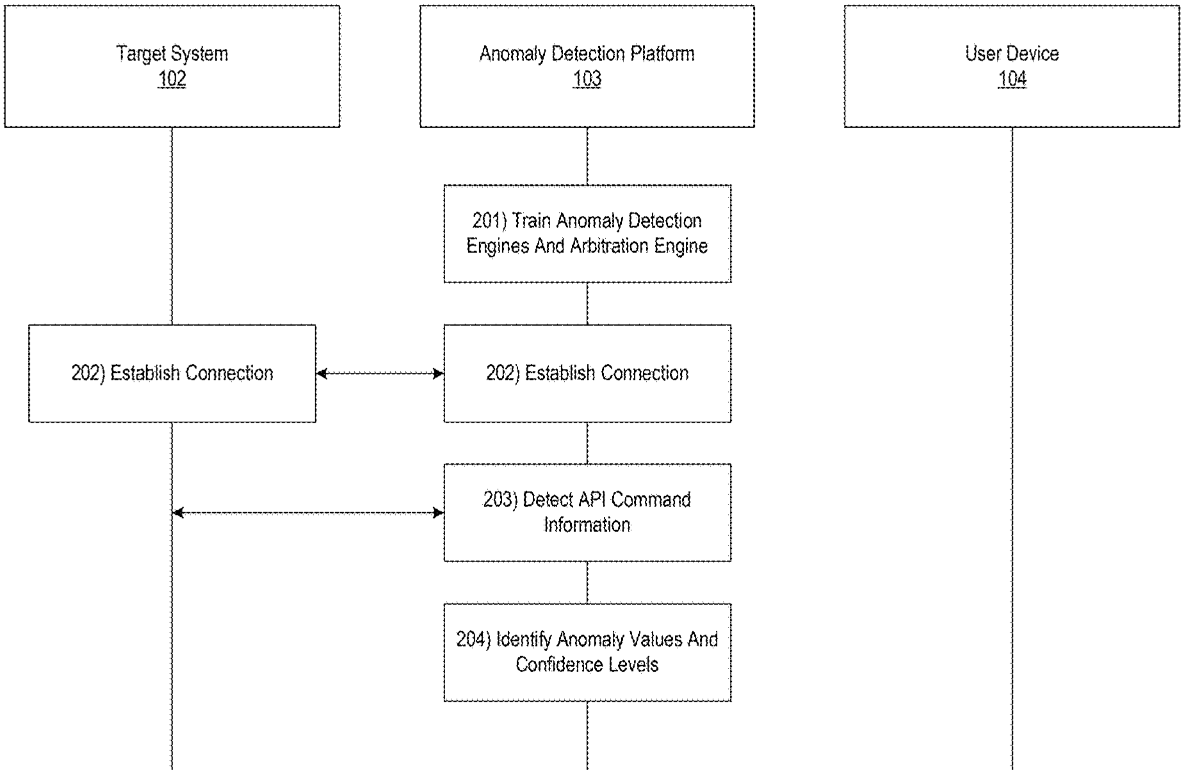
FIGS. 2A-2C depict an illustrative event sequence for using application programming interface (API) calls to detect proxy server anomalies in accordance with one or more example embodiments.
Figure 2B:
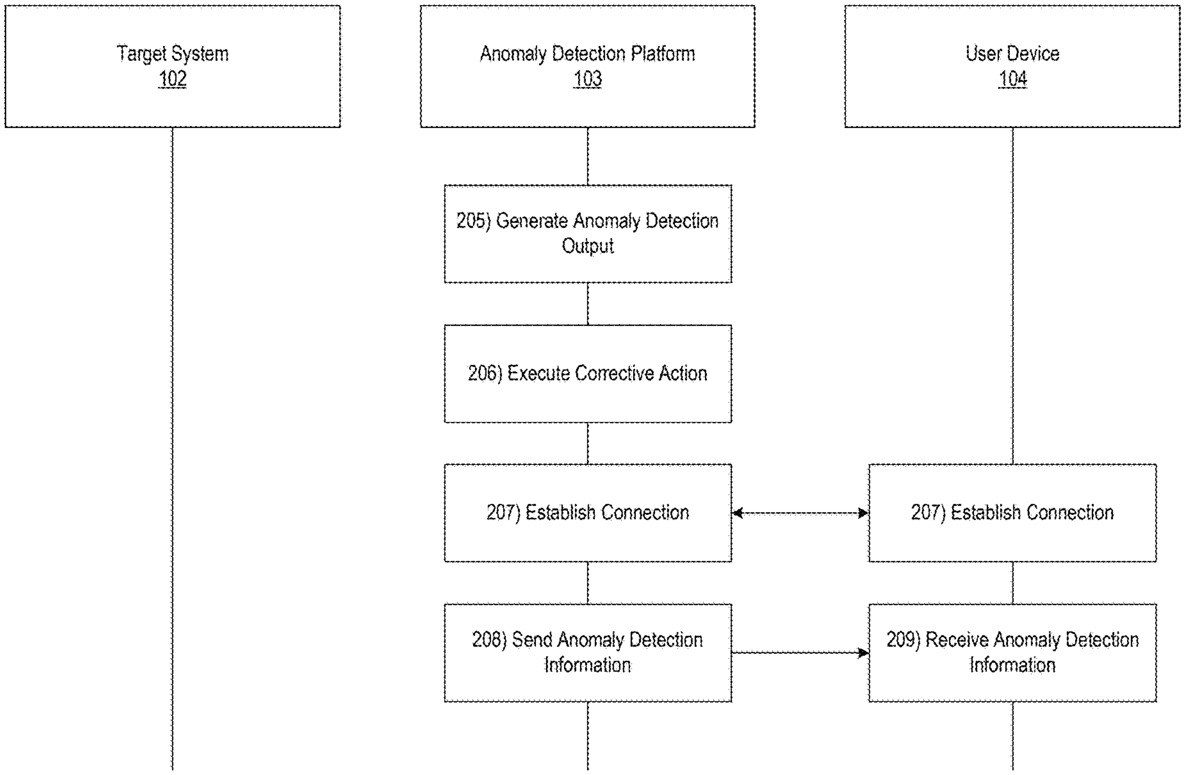
Figure 2C:
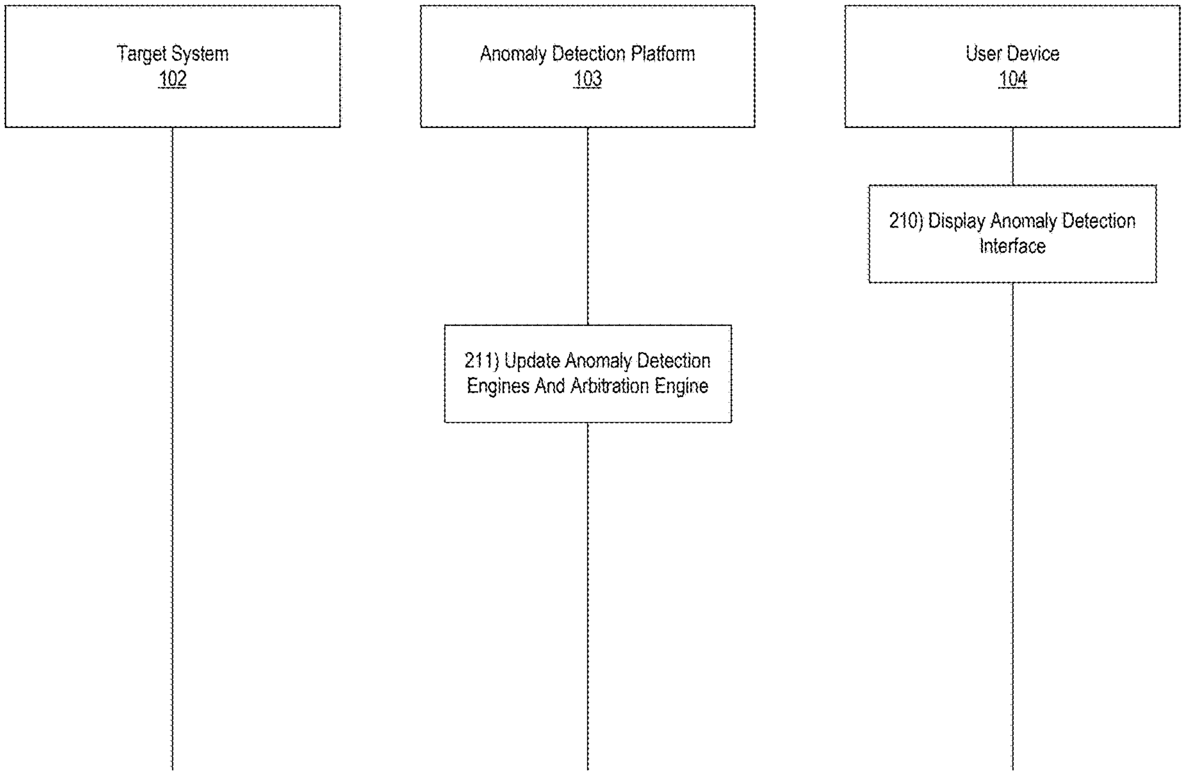

FIGS. 2A-2C depict an illustrative event sequence for using application programming interface (API) calls to detect proxy server anomalies in accordance with one or more example embodiments. Referring to FIG. 2A, at step 201, the anomaly detection platform 103 may train one or more anomaly detection engines. For example, the anomaly detection platform 103 may train the one or more anomaly detection engines to produce a binary value indicating whether or not an anomaly is detected based on input information, along with a confidence score corresponding to the binary value (e.g., indicating a confidence of the corresponding engine that the binary value correctly indicates whether or not an anomaly is detected).

In some instances, to perform such training, the anomaly detection platform 103 may receive historical API call information (e.g., historical numbers of certain API commands such as GET, CONNECT, REST, and/or other commands), including associated time series information (e.g., indicating when these commands are issued, which proxy servers are issuing/receiving the commands, or the like). In some instances, based on these historical API commands and the time series information, the anomaly detection platform 103 may establish baseline values for each command at a particular time/day/date at a particular proxy server (e.g., indicating how many of a particular type of request should be expected from a particular proxy server at a given time). These baseline values may be used for comparison to identify anomalies going forward.

Additionally, the anomaly detection platform 103 may train the anomaly detection engines to output confidence scores based on an amount of variation between a given number of API commands and the corresponding baseline value (whether the given number of API commands is less than, equal to, or greater than the corresponding baseline value). In some instances, the confidence scores may be numeric values between zero and one, where one indicates the highest confidence and zero indicates the lowest confidence.

In some instances, in training the one or more anomaly detection engines, the anomaly detection platform 103 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, isolation forest, SARIMAX, and/or other unsupervised models/techniques), and/or other techniques. In some instances, different techniques may be used to train the different anomaly detection engines (and thus, in some instances, each anomaly detection engine may train, employ, and/or otherwise implement different machine learning algorithms), and thus the binary outputs and/or confidence scores produced by the different anomaly detection engines may vary despite the input of the same API command information.

In some instances, in addition to training the one or more anomaly detection engines, the anomaly detection platform 103 may also train an arbitration engine, which may, e.g., be a hybrid artificial intelligence engine configured to assign supplementary confidence scores to the anomaly detection engines. For example, to perform such training, the anomaly detection platform 103 may receive historical outputs from the anomaly detection engines (e.g., indicating whether or not an anomaly is detected), along with feedback information (both from the arbitration engine itself and/or from human input) indicating whether or not these outputs correctly identified an anomaly.

Using the above noted supervised learning techniques, unsupervised learning techniques, and/or other techniques, the anomaly detection platform 103 may establish stored correlations between the various anomaly detection engines and their trustworthiness (e.g., a likelihood that a correct decision of anomaly versus no anomaly is produced). In some instances, training the arbitration engine to establish these correlations may, for example, enable the arbitration engine to assign, for a given anomaly detection engine (the identity of which may be fed into the arbitration engine), one or more supplemental confidence values (e.g., a machine learning based value, human learning based value, and/or other values).

At step 202, the anomaly detection platform 103 may establish a connection with the target system 102. For example, the anomaly detection platform 103 may establish a first wireless data connection with the target system 102 to link the anomaly detection platform 103 to the target system 102 (e.g., in preparation for detecting system performance/status information). In some instances, the anomaly detection platform 103 may identify whether a connection is already established with the target system 102. If a connection is already established with the target system 102, the anomaly detection platform 103 might not re-establish the connection. If a connection is not yet established with the target system 102, the anomaly detection platform 103 may establish the first wireless data connection as described herein.

At step 203, the anomaly detection platform 103 may detect API command information. For example, the anomaly detection platform 103 may monitor the target system 102 and detect the API command information associated with one or more proxy servers of the target system 102 via the first wireless data connection. In doing so, the anomaly detection platform 103 may detect API command frequency, time series information, and/or other information that may be used to detect anomalies in API command frequency.

At step 204, the anomaly detection platform 103 may input the API command information, detected at step 203, into the one or more anomaly detection engines to produce corresponding binary values indicating whether or not an anomaly is detected. In some instances, each of the anomaly detection engines may be configured to process different types of data, and thus different subsets of the system status information may be fed into each of the anomaly detection engines. In some instances, the API command information may be fed into multiple different anomaly detection engines. For example, each anomaly detection engine may compare the API command information and time series information to the baseline values established in the training of the anomaly detection engines at step 201. If the frequency of a given API command is outside of a predetermined variation range from the corresponding baseline value, a label of "anomaly" may be assigned to the API command information by the given anomaly detection engine. Otherwise, a label of "no anomaly" may be assigned. In instances where a label of "anomaly" is generated, a binary value of 0 may be output, whereas in instances where a label of "no anomaly" is generated, a binary value of 1 may be output. In some instances, a given anomaly detection engine may produce multiple (in some instances different) binary values. For example, the frequency of an API GET command might not reflect an anomaly, but the frequency of an API CONNECT command may reflect an anomaly, or vice versa.

Figure 5:
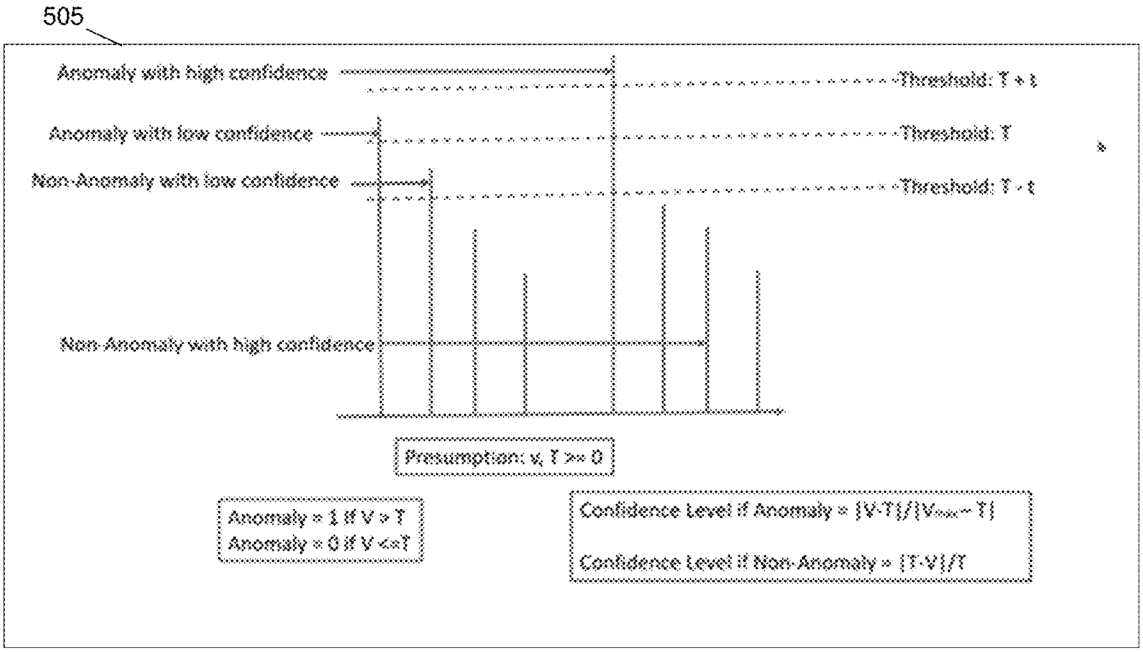
FIGS. 5-6 depict illustrative diagrams for using application programming interface (API) calls to detect proxy server anomalies in accordance with one or more example embodiments.

In some instances, the anomaly detection engines may also generate a confidence score corresponding to each binary value. More specifically, the anomaly detection engines may have threshold values for the various categories of API command information, which may be used to establish confidence scores associated with a given binary value. To identify the confidence score of a particular binary value, the following formula may be applied: confidence level if anomaly=

$$\frac{|V - T|}{|V_{max} - T|}$$

confidence level if no anomaly==

$$\frac{|T - V|}{T},$$

where T is the threshold value and V is the value of the system status information. Likewise, the binary value itself may be identified based on comparison of V to T, where the binary value is set using the following formula: binary value=1 if V>T (no anomaly); binary value=0 if V<=T (anomaly). This is further illustrated in chart 505 of FIG. 5, which illustrates that both anomaly and no anomaly decisions may be made with different levels of confidence. In some instances, a further threshold value (e.g., t as illustrated in FIG. 5), may be added or subtracted from the threshold value T to define high, low, and/or other confidence level ranges. In some instances, either of these threshold values may be specific to a system, type of information, and/or otherwise. In some instances, a value of t that may be added to the threshold T value may be different than a value of t that may be subtracted from the threshold T value.

Figure 6:
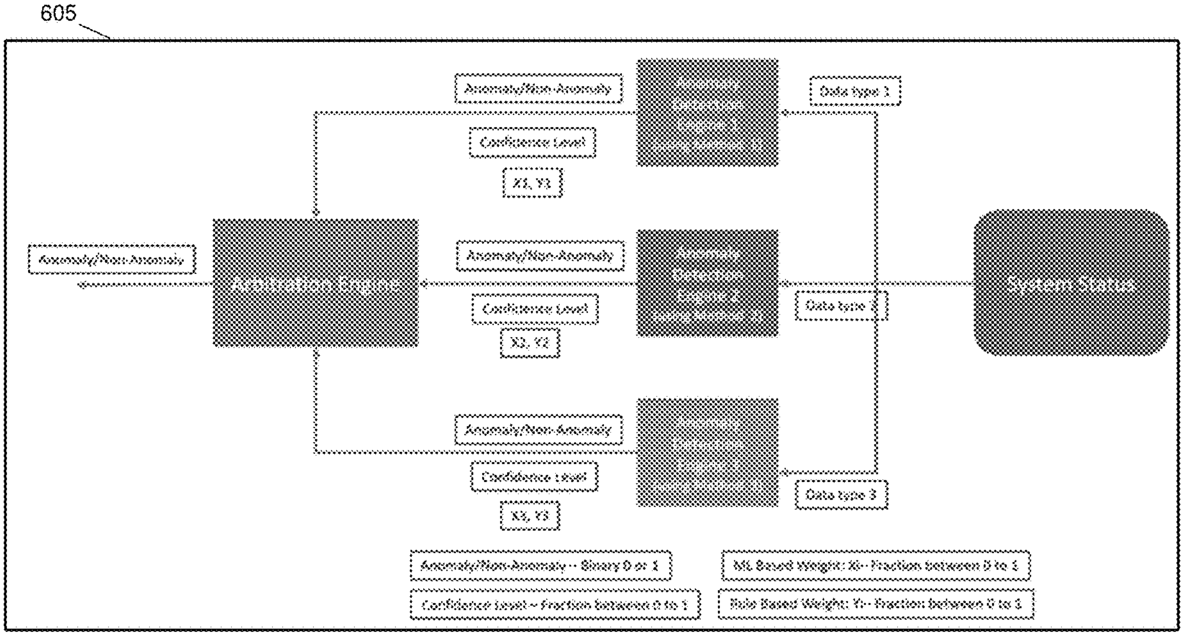

Using similar techniques, binary values and confidence values may be generated by each of the plurality of anomaly detection engines. For example, as is illustrated in chart 605 of FIG. 6, an anomaly decision and corresponding confidence level may be produced for each of three different anomaly detection engines.

Referring to FIG. 2B, at step 205, the anomaly detection platform 103 may use an arbitration engine to generate an anomaly detection output based on the various binary values and the corresponding confidence scores produced by each of the anomaly detection engines as described at step 204. For example, the anomaly detection platform 103 may generate an average of the binary values to produce an average value $A_{Binary}$ and an average of the confidence values to produce an average value $A_{confidence}$. If $A_{confidence}$ and $A_{Binary}$ are both greater than 0.5, the anomaly detection platform 103 may generate an anomaly detection output of 1 (indicating non-anomaly). Effectively, in this scenario, the anomaly detection platform 103 may be confident (based on a weighted average across the various anomaly detection engines) that no anomaly is detected. In contrast, if $A_{confidence}$ is greater than 0.5 but $A_{Binary}$ is less or equal to 0.5, the anomaly detection platform 103 may generate an anomaly detection output of 0 (indicating anomaly). Effectively, in this scenario, the anomaly detection platform 103 is confident (based on a weighted average across the various anomaly detection engines) that an anomaly is detected. In other instances, where $A_{confidence}$ is less than or equal to 0.5, regardless of the $A_{Binary}$ value, the decision may be indeterminant and the anomaly detection engines may be rerun on the system status information. Effectively to improve a confidence in a decision of whether or not an anomaly is detected.

Additionally or alternatively, the anomaly detection platform 103 may generate a first average of the confidence values associated with binary values indicating an anomaly and a second average of the confidence values associated with binary values indicating no anomaly. In these instances, the anomaly detection platform may multiply the first average by the binary value associated with anomalous behavior to produce a first weighted average, and multiply the second average by the binary value associated with non-anomalous behavior to produce a second weighted average. The anomaly detection platform 103 may generate absolute values of the first average and the second average, and select, as the weighted average, one of the first average or the second average based on which of the first average or the second average has a higher associated absolute value. In these instances, if the weighted average is greater than 0.5, no anomaly may be detected, whereas if the weighted average is less than or equal to 0.5, an anomaly may be detected. Although the threshold of 0.5 is described herein, a different threshold may be implemented without departing from the disclosure. In some instances, this detection of whether or not an anomaly is detected may be performed in real time, in a predictive manner, and/or otherwise.

Additionally or alternatively, in some instances, the anomaly detection platform 103 may input identification information of the anomaly detection engines into the arbitration engine, which may, e.g., identify, using the stored correlations between the supplemental confidence values (which may, e.g., have been established during initial training at step 201), supplemental confidence values for each anomaly detection engine (e.g., a first value based on machine learning intelligence, a second value based on human intelligence, and/or other values). In some instances, the anomaly detection platform 103 may select an anomaly detection engine with the highest supplemental confidence value (e.g., highest machine learning based value, human intelligence value, combined value, or the like). Additionally or alternatively, the arbitration engine may generate a weighted confidence level by applying the supplemental confidence value(s) to the confidence values generated by the anomaly detection engines themselves (e.g., by multiplying the values). In these instances, the arbitration engine may select an anomaly detection engine based on the weighted confidence levels (e.g., select an anomaly detection engine associated with the highest weighted confidence level). After selecting an anomaly detection engine, the arbitration engine may identify the binary value output by that engine, and compare the binary value output to a threshold (e.g., 0.5 or the like). If the binary value output exceeds the threshold, the arbitration engine may output anomaly detection information of "no anomaly." Otherwise, if the binary value is less than or equal to the threshold, the arbitration engine may output anomaly detection information of "anomaly." Although the threshold of 0.5 is described herein, a different threshold may be implemented without departing from the disclosure. In some instances, this detection of whether or not an anomaly is detected may be performed in real time, in a predictive manner, and/or otherwise.

If an anomaly is detected, the anomaly detection platform 103 may proceed to step 206. Otherwise, if no anomaly is detected, the anomaly detection platform 103 may proceed to step 211.

At step 206, based on detection of an anomaly at the target system 102, the anomaly detection platform 103 may initiate one or more corrective actions. For example, the anomaly detection platform 103 may take the target system offline, redistribute load of the target system, add memory to the target system, and/or perform other actions to address the detected anomaly. In some instances, in doing so, the anomaly detection platform 103 may send one or more commands directing the target system 102 and/or other systems to execute one or more actions to achieve the correction, which may, e.g., cause the target system 102 and/or other systems to perform the corresponding actions.

At step 207, the anomaly detection platform 103 may establish a connection with the user device 104. For example, the anomaly detection platform 103 may establish a second wireless data connection with the user device 104 to link the anomaly detection platform 103 to the user device 104 (e.g., in preparation for sending anomaly detection information). In some instances, the anomaly detection platform 103 may identify whether or not a connection is already established with the user device 104. If a connection is already established with the user device 104, the anomaly detection platform 103 might not re-establish the connection. If a connection is not yet established with the user device 104, the anomaly detection platform 103 may establish the second wireless data connection as described herein.

At step 208, the anomaly detection platform 103 may generate anomaly detection information (e.g., indicating the detected anomaly) and send the anomaly detection information to the user device 104. For example, the anomaly detection platform 103 may send the anomaly detection information via the communication interface 113 and while the second wireless data connection is established. In some instances, the anomaly detection platform 103 may also send one or more commands directing the user device 104 to display the anomaly detection information.

At step 209, the user device 104 may receive the anomaly detection information. For example, the user device 104 may receive the anomaly detection information while the second wireless data connection is established. In some instances, the user device 104 may also receive the one or more commands directing the user device 104 to display the anomaly detection information.

Figure 4:
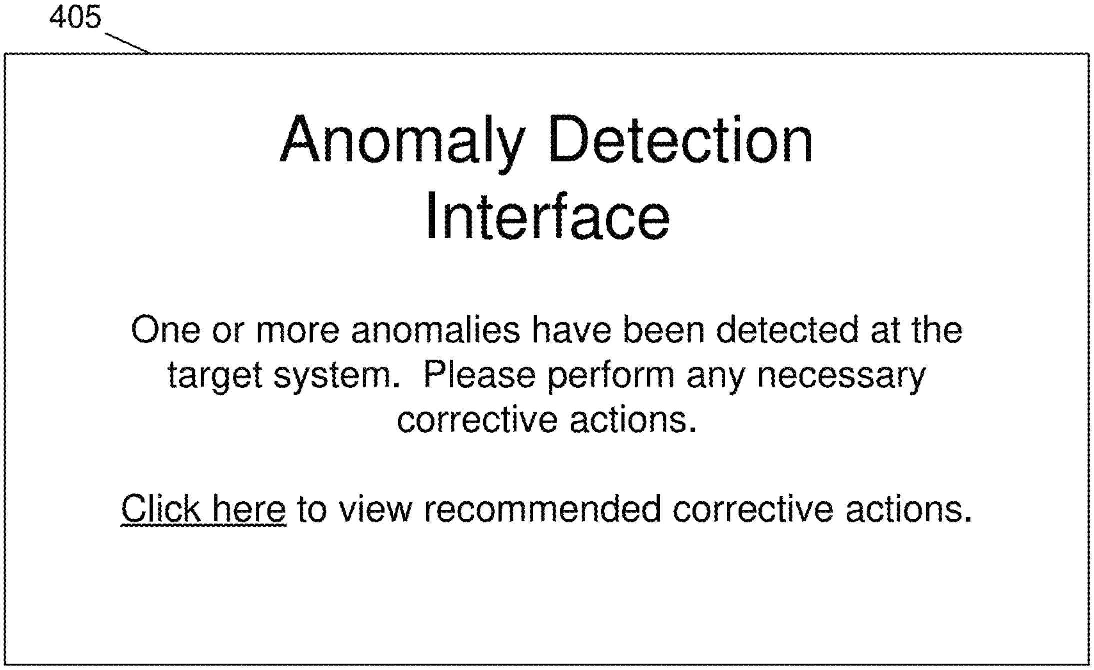
FIG. 4 depicts an illustrative user interface for using application programming interface (API) calls to detect proxy server anomalies in accordance with one or more example embodiments.

Referring to FIG. 2C, at step 210, based on or in response to the one or more commands directing the user device 104 to display the anomaly detection information, the user device 104 may display the anomaly detection information. For example, the user device 104 may display a graphical user interface similar to graphical user interface 405, which is illustrated in FIG. 4.

At step 211, the anomaly detection platform 103 may update the anomaly detection engines and/or arbitration engine based on the API call information, the time series information, baseline values, confidence scores, binary values, anomaly detection outputs, user feedback information, and/or other information. In doing so, the anomaly detection platform 103 may continue to refine the anomaly detection engines and/or arbitration engine using a dynamic feedback loop which may, e.g., increase the accuracy and effectiveness of the anomaly detection platform 103 in reconciling different model outputs for consolidated anomaly detection. For example, the anomaly detection platform 103 may reinforce, modify, and/or otherwise update the anomaly detection engines, baseline values, or the like thus causing the anomaly detection platform 103 to continuously improve.

In some instances, the anomaly detection platform 103 may continuously refine anomaly detection engines and/or arbitration engine. In some instances, the anomaly detection platform 103 may maintain an accuracy threshold, and may pause refinement (through the dynamic feedback loops) of the anomaly detection engines and/or thresholds if the corresponding accuracy is identified as greater than the corresponding accuracy threshold. Similarly, if the accuracy fails to be equal or less than the given accuracy threshold, the anomaly detection platform 103 may resume refinement of the engine through the corresponding dynamic feedback loop.

Figure 3:
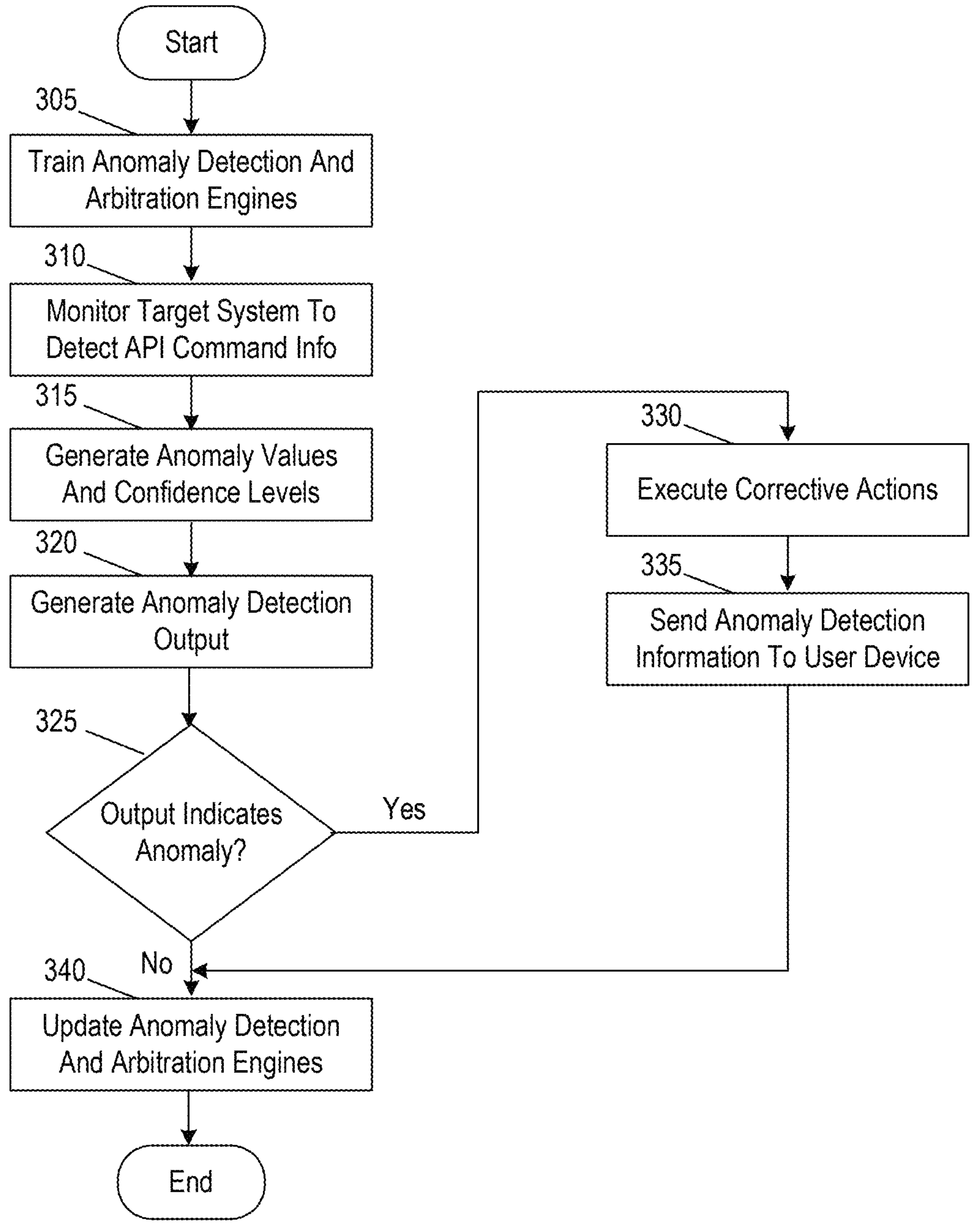
FIG. 3 depicts an illustrative method for using application programming interface (API) calls to detect proxy server anomalies in accordance with one or more example embodiments.

FIG. 3 depicts an illustrative method for application programming interface (API) calls to detect proxy server anomalies in accordance with one or more example embodiments. Referring to FIG. 3, at step 305, a computing platform comprising one or more processors, memory, and a communication interface may train a plurality of anomaly detection engines and an arbitration engine. At step 310, the computing platform may monitor a target system to detect API command information. At step 315, the computing platform may generate anomaly values and confidence values corresponding to the API command information using the plurality of anomaly detection engines. At step 320, the computing platform may use the arbitration engine to reconcile the anomaly values and confidence values of the plurality of anomaly detection engines and generate a corresponding anomaly detection output. At step 325, the computing platform may identify whether or not the anomaly detection output indicates that the API command information indicates an anomaly based on the anomaly detection output. If an anomaly is not detected, the computing platform may proceed to step 340. Otherwise, if an anomaly is detected, the computing platform may proceed to step 330. At step 330, the computing platform may execute one or more corrective actions to address the detected anomaly. At step 335, the computing platform may send anomaly detection information to a user device for display. At step 340, the computing platform may update the anomaly detection engines and the arbitration engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, using historical application programming interface (API) call information, an anomaly detection engine, wherein training the anomaly detection engine configures the anomaly detection engine to output, for a target system, a binary value indicating whether or not the target system is experiencing anomalous API call behavior, wherein the target system includes a proxy server, wherein outputting the binary value further comprises outputting a confidence value indicating a confidence of the anomaly detection engine that the binary value correctly indicates whether or not an anomaly is detected;

train, using the historical API call information, a plurality of additional anomaly detection engines, wherein each of the plurality of additional anomaly detection engines corresponds to a different machine learning model, and wherein training the plurality of additional anomaly detection engines configures each of the additional plurality of anomaly detection engines to output an additional binary value indicating whether or not the target system is experiencing anomalous API call behavior and additional confidence values corresponding to the additional binary values;

monitor the target system to collect API call information for the proxy server;

input the API call information into the anomaly detection engine, wherein the anomaly detection engine outputs, based on the API call information, a binary value indicating whether the API call information is anomalous;

compare the binary value to a predetermined threshold value, wherein comparing the binary value to the predetermined threshold value further comprises:

inputting the binary value and the additional binary values into an arbitration engine, wherein the arbitration engine generates a weighted average based on the confidence value, the additional confidence values, the binary value, and the additional binary values, and comparing the weighted average to the predetermined threshold value;

based on identifying that the selected binary value is less than the predetermined threshold value, label the target system as experiencing anomalous behavior; and execute one or more corrective actions to address the anomalous behavior.

2. The computing platform of claim 1, wherein outputting the binary value is based on a time series analysis of the API call information.

3. The computing platform of claim 1, wherein the target system includes one or more supporting applications, one or more load balancers, one or more additional proxy servers, and one or more database servers.

4. The computing platform of claim 1, wherein one of the anomaly detection engine or the plurality of additional anomaly detection engines includes an isolation forest model.

5. The computing platform of claim 1, wherein generating the weighted average comprises:

generating a first average of the confidence values associated with binary values indicating an anomaly;

multiplying the first average by the binary value associated with anomalous behavior to produce a first weighted average;

generating a second average of the confidence values associated with binary values indicating no anomaly;

multiplying the second average by the binary value associated with non-anomalous behavior to produce a second weighted average;

generating absolute values of the first average and the second average; and selecting, as the weighted average, one of the first average or the second average based on which of the first average or the second average has a higher associated absolute value.

6. The computing platform of claim 1, wherein the memory stores additional computer readable instructions that, when executed by the at least one processor, cause the computing platform to:

train, using historical anomaly prediction information, a hybrid artificial intelligence engine, wherein training the hybrid artificial intelligence engine configures the hybrid artificial intelligence engine to assign weight values to each of the anomaly detection engine and the plurality of additional anomaly detection engines and to select an anomaly detection result from the anomaly detection engine and the plurality of additional anomaly detection engines based on the weight values.

7. The computing platform of claim 6, wherein comparing the binary value to the predetermined threshold value further comprises:

inputting the binary value and the additional binary values into the hybrid artificial intelligence engine, wherein the hybrid artificial intelligence engine assigns the weight values to each of the anomaly detection engine and the plurality of additional anomaly detection engines, and selects a binary value based on the weighting; and comparing the selected binary value to the predetermined threshold value.

8. The computing platform of claim 7, wherein assigning the weight values comprises assigning, to each of the anomaly detection engine and the plurality of additional anomaly detection engines, a first weight value generated using statistical machine learning and a second weight value generated based on human intelligence.

9. The computing platform of claim 7, wherein selecting the binary value comprises selecting the binary value produced with the highest weight value.

10. The computing platform of claim 1, wherein the target system is labelled as experiencing the anomalous behavior in real time.

11. The computing platform of claim 1, wherein the target system is labelled as experiencing the anomalous behavior in a predictive manner.

12. The computing platform of claim 1, wherein executing the one or more corrective actions comprises one or more of: taking the proxy server offline, redistributing load of the proxy server, or adding memory to the proxy server.

13. The computing platform of claim 1, wherein the memory stores additional computer readable instructions that, when executed by the at least one processor, cause the computing platform to:

send, to a user device of a system administrator, an alert indicating the anomalous behavior and one or more commands directing the user device to display the alert, wherein sending the one or more commands directing the user device to display the alert causes the user device to display the alert.

14. The computing platform of claim 1, wherein the memory stores additional computer readable instructions that, when executed by the at least one processor, cause the computing platform to:

update, based on the API call information and the label, the anomaly detection engine.

15. A method comprising:

at a computing platform comprising at least one processor, a communication interface, and memory:

training, using historical application programming interface (API) call information, an anomaly detection engine, wherein training the anomaly detection engine configures the anomaly detection engine to output, for a target system, a binary value indicating whether or not the target system is experiencing anomalous API call behavior, wherein the target system includes a proxy server, wherein outputting the binary value further comprises outputting a confidence value indicating a confidence of the anomaly detection engine that the binary value correctly indicates whether or not an anomaly is detected;

training, using the historical API call information, a plurality of additional anomaly detection engines, wherein each of the plurality of additional anomaly detection engines corresponds to a different machine learning model, and wherein training the plurality of additional anomaly detection engines configures each of the additional plurality of anomaly detection engines to output an additional binary value indicating whether or not the target system is experiencing anomalous API call behavior and additional confidence values corresponding to the additional binary values;

monitoring the target system to collect API call information for the proxy server;

inputting the API call information into the anomaly detection engine, wherein the anomaly detection engine outputs, based on the API call information, a binary value indicating whether the API call information is anomalous;

comparing the binary value to a predetermined threshold value, wherein comparing the binary value to the predetermined threshold value further comprises:

inputting the binary value and the additional binary values into an arbitration engine, wherein the arbitration engine generates a weighted average based on the confidence value, the additional confidence values, the binary value, and the additional binary values, and comparing the weighted average to the predetermined threshold value;

based on identifying that the selected binary value is less than the predetermined threshold value, labelling the target system as experiencing anomalous behavior; and executing one or more corrective actions to address the anomalous behavior.

16. The method of claim 15, wherein outputting the binary value is based on a time series analysis of the API call information.

17. One or more non-transitory computer-readable media storing instructions that, when executed by a computing platform comprising at least one processor, a communication interface, and memory, cause the computing platform to:

train, using historical application programming interface (API) call information, an anomaly detection engine, wherein training the anomaly detection engine configures the anomaly detection engine to output, for a target system, a binary value indicating whether or not the target system is experiencing anomalous API call behavior, wherein the target system includes a proxy server, wherein outputting the binary value further comprises outputting a confidence value indicating a confidence of the anomaly detection engine that the binary value correctly indicates whether or not an anomaly is detected;

train, using the historical API call information, a plurality of additional anomaly detection engines, wherein each of the plurality of additional anomaly detection engines corresponds to a different machine learning model, and wherein training the plurality of additional anomaly detection engines configures each of the additional plurality of anomaly detection engines to output an additional binary value indicating whether or not the target system is experiencing anomalous API call behavior and additional confidence values corresponding to the additional binary values;

monitor the target system to collect API call information for the proxy server;

input the API call information into the anomaly detection engine, wherein the anomaly detection engine outputs, based on the API call information, a binary value indicating whether the API call information is anomalous;

compare the binary value to a predetermined threshold value, wherein comparing the binary value to the predetermined threshold value further comprises:

inputting the binary value and the additional binary values into an arbitration engine, wherein the arbitration engine generates a weighted average based on the confidence value, the additional confidence values, the binary value, and the additional binary values, and comparing the weighted average to the predetermined threshold value;

based on identifying that the selected binary value is less than the predetermined threshold value, label the target system as experiencing anomalous behavior; and execute one or more corrective actions to address the anomalous behavior.

* * * * *